United States Patent [19]

Sullivan

[11] Patent Number: 4,579,484

[45] Date of Patent: Apr. 1, 1986

[54] UNDERWATER TAPPING MACHINE

[75] Inventor: James B. Sullivan, Tulsa, Okla.

[73] Assignee: T. D. Williamson, Inc., Tulsa, Okla.

[21] Appl. No.: 410,089

[22] Filed: Aug. 20, 1982

[51] Int. Cl.$^4$ .................... B23B 41/00; E21B 7/124
[52] U.S. Cl. ............................ 408/56; 173/DIG. 1;
175/6; 175/107
[58] Field of Search .................... 408/59, 56, 234;
173/DIG. 1; 175/6, 107; 60/593; 92/92

[56] References Cited

U.S. PATENT DOCUMENTS

| | | | |
|---|---|---|---|
| 3,436,914 | 4/1969 | Rosfelder | 175/6 X |
| 3,614,252 | 10/1971 | Rose | 408/9 |
| 3,907,000 | 9/1975 | Carr | 92/92 X |
| 4,019,591 | 4/1977 | Fox | 175/107 |
| 4,260,032 | 4/1981 | Fox | 175/107 |

FOREIGN PATENT DOCUMENTS

| | | | |
|---|---|---|---|
| 829074 | 12/1969 | Canada | 175/6 |
| 2063233 | 1/1973 | Fed. Rep. of Germany | 173/DIG. 1 |
| 1394461 | 5/1975 | United Kingdom | 60/593 |

*Primary Examiner*—Z. R. Bilinsky
*Attorney, Agent, or Firm*—Head, Johnson & Stevenson

[57] ABSTRACT

An underwater tapping machine having a body equipped for attachment to a fitting secured to a pipeline and a rotatable boring bar within the body, a gear case affixed to the body to activate the boring bar, a containment vessel supported by the tapping machine body having a first opening communicating with the vessel exterior and thus to the pressure of fluid in which the tapping machine is employed, the containment vessel having a second opening and a fluid barrier pressure transmitting member dividing the interior of the vessel into a first portion having the first opening therein and a second portion communicating with the second opening, the second portion having liquid lubricant therein, and conduits extending from the containment vessel second opening to the interior of the tapping machine body and gear case so that the pressure of fluid in which the tapping machine is employed is applied by way of the pressure transmitting member to the liquid lubricant and thus to the interior of the tapping machine to thereby equalize the pressure interiorially of the tapping machine with the ambient pressure of fluid in which the machine is used to prevent the penetration of ambient fluid water into the interior of the tapping machine.

7 Claims, 4 Drawing Figures

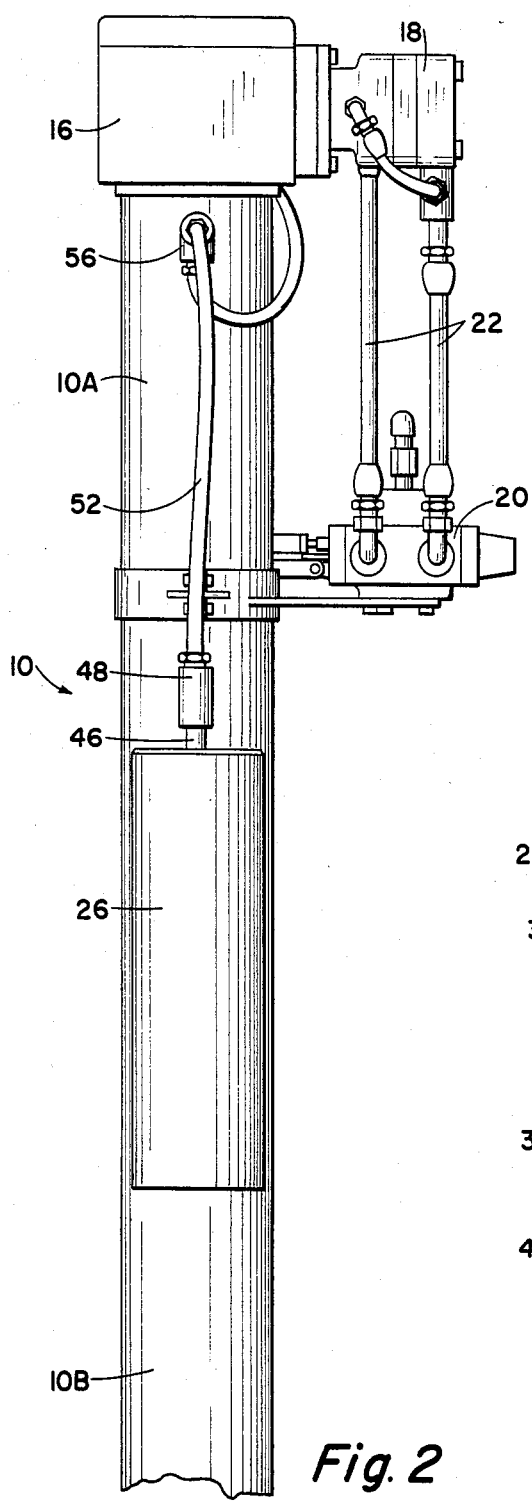
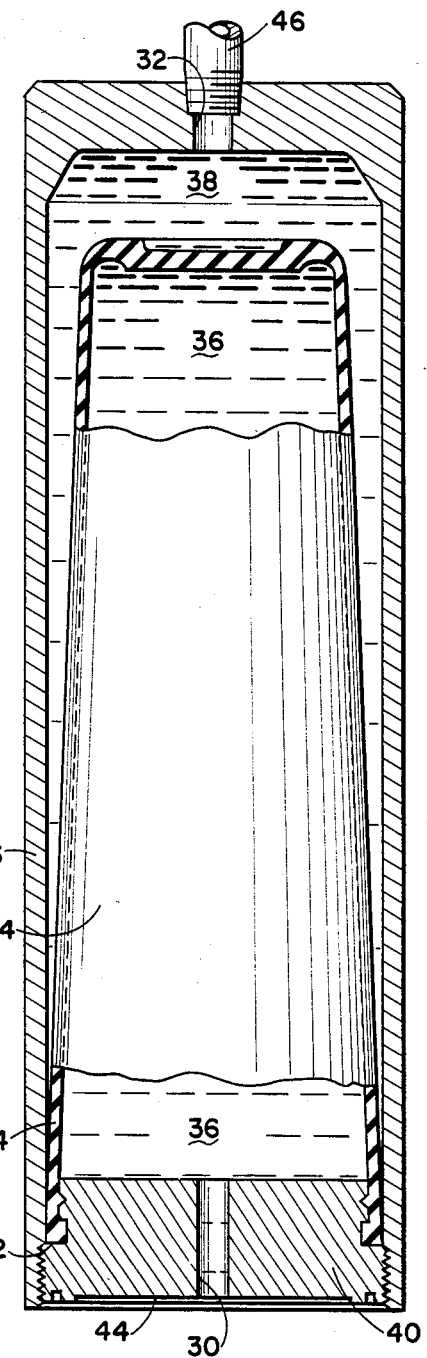
Fig. 2
Fig. 3

4,579,484

UNDERWATER TAPPING MACHINE

SUMMARY OF THE INVENTION

An apparatus is provided for tapping an underwater pipeline. The underwater tapping machine is formed of a body which is typically elongated and tubular. The body has a rotating boring bar therein. The lower end of the body is provided with means, such as a flange, by which it is secured to a fitting attached to a pipeline. A gearbox is affixed to the upper end of the tapping machine body and provides means for rotation of the boring bar. The lower end of the boring bar is equipped to receive a cutter. Rotative energy, such as provided by a hydraulic motor, is supplied to the gearbox, and this rotative force in turn is applied to rotate the boring bar.

Supported to the tapping machine body is a containment vessel having a first and second opening therein. The first opening communicates with the exterior of the vessel, that is, to the water environment in which the tapping machine is used. The interior of the vessel is provided with an elastomeric bladder dividing the vessel interior into a first portion which communicates with the first opening in the body and the second portion which communicates with the second opening in the body. The second portion of the vessel interior is filled with liquid lubricant. Piping connects the vessel second opening with the interior of the tapping machine body and gear case. When the tapping machine is positioned in water for use in tapping an opening in an underwater pipeline, the pressure of the water environment is received within the first portion of the containment vessel. The elastomeric bladder transmits this pressure to liquid lubricant in the vessel second portion which in turn is communicated to the interior of the tapping machine body and gear case. In this way pressure within the tapping machine is equalized in a way such as to prevent the penetration of water into the interior of the tapping machine.

BRIEF DESCRIPTION OF THE DRAWINGS

FIG. 2 is an fragmentary elevational view as shown in FIG. 1, and showing a side view of the tapping machine, the lower portion of the tapping machine not being shown FIG. 3 is an enlarged cross-sectional view of the containment vessel as taken along the line 3—3 of FIG. 1.

DETAILED DESCRIPTION

Figures 1, 4:
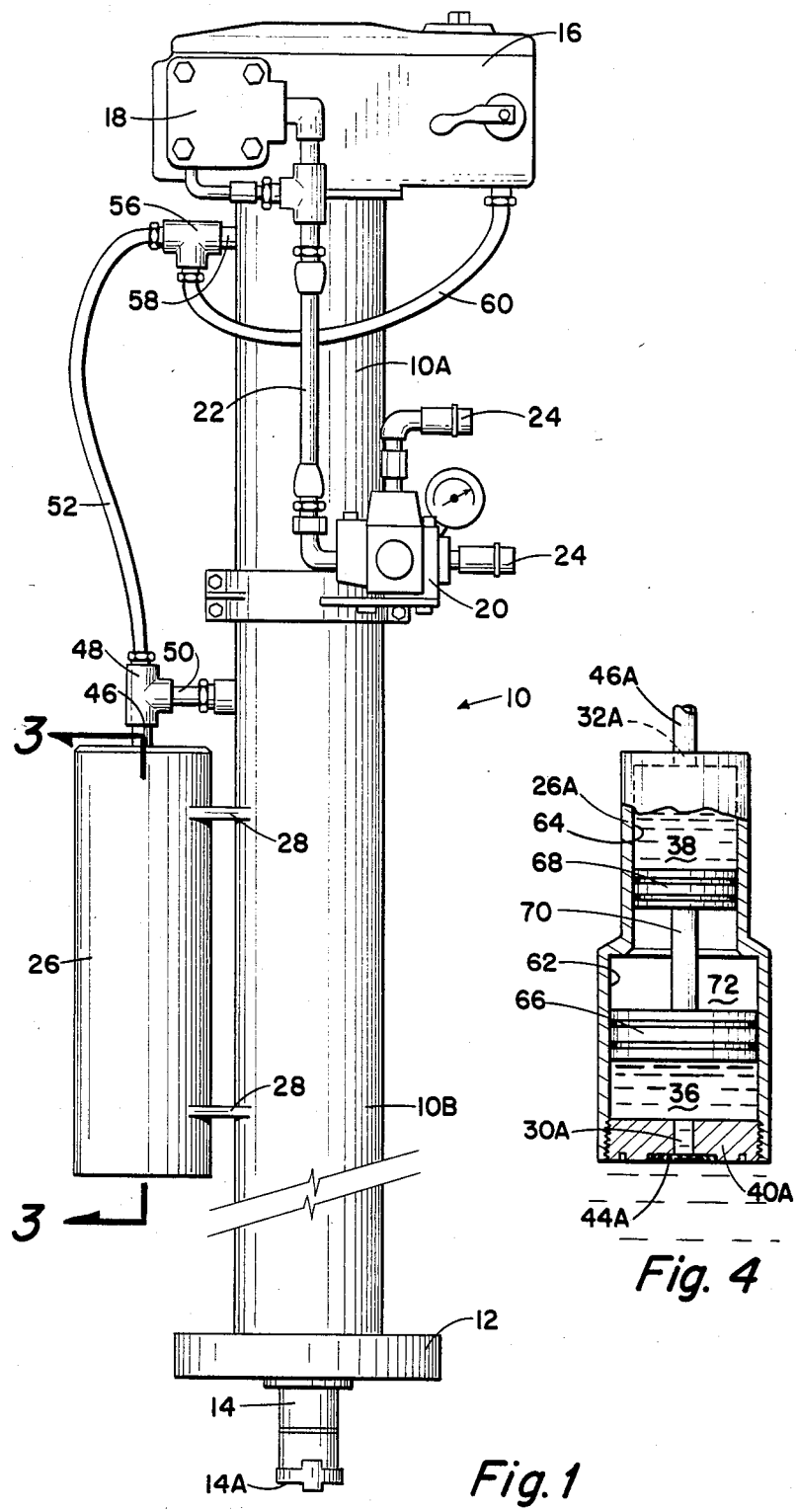
FIG. 1 is an elevational external view of an underwater tapping machine having means for preventing water from penetrating into the tapping machine when it is used to tap an underwater pipeline.
FIG. 4 is a cross-sectional view of an alternate arrangement of the containment vessel.

The use of tapping machines for tapping openings in pipelines is well known. Prior issued U.S. Pat. No. 3,614,252 entitled: "Tapping Apparatus"; is exemplary of such devices. The contents of this prior issued United States patent is incorporated herein by reference. This prior patent illustrates and describes apparatus and techniques for making what is termed "Hot Taps" in pipelines, that is, where taps are made in a pipeline while it is under pressure and in most instances, while the function of the pipeline in transporting fluids, either liquids or gases, is not interrupted. Taps are made in pipelines for a variety of reasons such as to provide means to circumvent a defective portion of a pipeline while the defective portion is being replaced, to provide a branch fitting, to provide means for plugging off the pipeline, and for other reasons well known in the pipeline industry.

Cutting an opening in the wall of a pipeline is a difficult and time-consuming job and requires well-engineered and well-constructed tapping equipment. This equipment must operate with precision and must be internally well lubricated. For this reason tapping machines typically are filled with internal lubricant. When machines are used in underwater application the hydrostatic pressure tends to force water through openings in the machine. When water enters the interior of a tapping machine, it interferes with the lubrication, causes rust and corrosion, and therefore is highly deleterious to the performance and life of tapping machines. The present invention is directed towards a means of adapting tapping machines constructed for use with pipelines buried in the earth or above ground so that they can be successfully employed in tapping underwater pipelines.

Referring first to FIGS. 1 and 2, the exterior appearance of the tapping machine having the improvements of this invention is shown, it being understood that the actual physical appearance of tapping machines which may employ the invention may vary substantially from that shown in FIGS. 1 and 2. The typical tapping machine includes a tapping machine body generally indicated by the numeral 10. Body 10 is elongated and cylindrical and has upper body portion 10A and lower body portion 10B. The lower end of the body is adapted to be secured to apparatus for connecting it to a pipeline. In the typical application of the invention a T-fitting is affixed to a pipeline in an area to be tapped. The T-fitting may be bolted or, preferably, welded in place. The lower end of the body is provided with a flange 12 which is adapted to be secured to a fitting affixed to a pipeline or, in most instances, a tapping valve is provided between the fitting and the tapping machine in which case the flange 12 is affixed to the upper end of the tapping valve. Since the use of fittings secured to pipelines and the use of tapping valves are well known in industry, they are not illustrated here.

The body 10 supports an internal rotatable boring bar 14. The lower end of the boring bar 14A is adapted to receive and have secured to it a cutter (not shown) which penetrates the pipeline to accomplish the tapping operation. The interior arrangement of the body 10 provides means for rotation of the boring bar 14 and axial advancement of it as the cutting operation is accomplished.

Affixed to the upper end of body 10 is a gear case 16. The function of gear case 16 is to apply rotative force to boring bar 14. Energy is supplied to the gear case 16 such as by means of a hydraulic drive unit 18. The use of a hydraulic drive unit 18 is exemplary since rotative energy may be applied in a variety of other ways such as by the use of an air motor, an electric motor, or any other similar device.

Supported on the body 10 is a control valve assembly 20 having piping 22 connecting to the hydraulic drive unit 18. Disconnect fittings 24 provide means to receive hydraulic fluid flow which is regulated by the control valve assembly 20 to in turn regulate the rotative power applied by the hydraulic drive unit 18 to gearbox 16. The means of providing the hydraulic power applied to disconnect fittings 24 is not illustrated, it being also well known in the industry.

The tapping apparatus described to this point is of a type well known and used in industry for providing taps in pipelines buried in the earth or supported above the earth. The invention is directed towards means for adapting the tapping machine as encompassed in the elements 10-24 for use in tapping underwater pipelines in which the tapping machine must function in a water environment and in some cases in which the water is at a substantial depth.

It can be appreciated that the interior arrangement of the tapping machine body 10 and gear case 16 employ apparatus which must be well lubricated. For this reason, the interior of the tapping machine body and gear case are typically filled with an oil or some other kind of liquid lubricant. When the tapping machine is employed in underwater environments there is a strong tendency for water to leak into the interior of the tapping machine. This is particularly true when the tapping machine is being lowered into position and before the flange 12 is attached to a T fitting or tapping valve. Even when all devices are in position and secured as leakproof as possible, there still remains the possibility of leakage of water into the machine interior. When water is permitted to enter into the interior of the tapping machine body or gear case the function of the lubricant is destroyed or at least substantially reduced and corrosion inevitably occurs. The invention provides means of preventing or substantially reducing the possibility of water entering into the interior of the tapping machine when it is employed for underwater applications.

Affixed to the tapping machine body is a containment vessel 26. The vessel is illustrated as being elongated and cylindrical and affixed by brackets 28 to the tapping machine body. The containment vessel may be of a variety of different external configurations and can be held to the tapping machine such as by means of straps, clamps, or otherwise.

As shown in FIG. 3, the containment vessel 26 has a first opening 30 and a second opening 32. The vessel includes a bladder 34 which divides the interior into a first portion 36 and a second portion 38, the first portion 36 having communication with first opening 30 and the second portion 38 with second opening 32. In the illustrated arrangement the containment housing 26 has a threaded lower end receiving a closure member 40 which engages the lower peripheral surface 42 of bladder 34. The bladder is of truncated conical configuration. This is by way of illustration only as the bladder may be of a variety of shapes and secured in a variety of ways to the interior of the vessel 26.

Positioned across the first opening 30 is a screen 44 which serves to prevent solid objects from passing into the vessel interior portion 36 through the opening 30.

Affixed to second opening 32 is a short length of conduit 46 which in turn connects with a T-fitting 48 (see FIGS. 1 and 2). Extending from the T-fitting is a conduit 50 which communicates with the interior of the housing lower portion 10B. Also extending from T-fitting 48 is a second conduit 52 connecting to a second T-fitting 56. Extending from this second T-fitting is a short conduit 58 connecting to the interior of the body upper portion 10A. In addition, extending from second T 56 is a conduit 60 connecting to the interior of gear case 16.

As the tapping machine is subjected to an underwater environment the pressure of water is communicated through opening 30 into the interior portion 36. This pressure is readily applied through bladder 34 to the liquid lubricant in portion 38. The pressure of the liquid lubricant is in turn applied through the conduits and T-fittings to the interior of the body portions 10A and 10B and to gear case 16. The invention is illustrated as applying pressure of liquid lubricant to two portions, that is, upper portion 10A and lower portion 10B of the body 10 which will be the preferred arrangement if interior seals are employed to separate internal portions of the body. If the mechanical arrangement is such that all portions of the interior of the tapping machine body 10 are freely subject to the same liquid lubricant, then only one connection to body 10 would be required. The invention illustrates the concept that each isolated or separate system containing liquid lubricant is capable of being subjected to the pressure of the water environment by means of extending a separate conduit to connect with each such interior portion.

FIG. 4 shows an alternate arrangement of the containment vessel. The vessel 26A provides two internal cylinders 62 and 64. The cylinders are co-axial with cylinder 62 being of a diameter larger than cylinder 64. Received in cylinder 62 is a first piston 66 and in cylinder 64 is a second piston 68. The pistons are connected by a rod 70.

Vessel 26A receives a closure member 40A having an opening 30A therein covered by a screen 44A. Water in which the equipment is submersed enters through opening 30A into the vessel first portion interior 36. This piston 66 is subject to the pressure of the environment in which the underwater tapping machine is used. The pressure on piston 66 is conveyed by rod 70 to piston 68 to thereby apply pressure on fluid, preferably oil, contained in the vessel second interior portion 36, that is, the pressure of fluid in line 46A will be greater than the ambient or environmental pressure. This means that with the design of the containment vessel of FIG. 4, a positive pressure will always exist on the interior of the tapping machine compared to the exterior pressure. Therefore, if any leakage occurs it will be from the interior to the exterior, thereby more assuredly preventing the leakage of water into the interior of the tapping machine.

The area 72 between the pistons 66 and 68 is preferably filled with air other other compressible gas since the volume will change as the pistons are displaced. The embodiment of FIG. 4 could be constructed of a single cylinder 62 and piston 66 with conduit 46A connected to area 72. In this manner, the piston 66 would serve to separate the fluid in area 36 from the oil in condiut 46A; that is, the piston would serve the same function as the bladder 34 in FIG. 3. The movement of the single piston would equalize pressure within the interior of the underwater tapping machine with the ambient pressure whereas the two piston arrangement of FIG. 4 provides for a positive pressure within the tapping machine.

The provision of means of equalizing the pressure on the liquid lubricant internally of the tapping machine body and gear case with the hydrostatic pressure of the water environment as illustrated and described herein means that the potential for leakage of water into the interior of the tapping machine is substantially eliminated. The machine seals and fittings are required only to serve as barriers to the passage of liquid lubricant or water but are not required to resist high pressure differentials. If pockets of air exist within the tapping machine body 10 or gear case 16, which will be compressed as the hydrostatic pressure of water in which the machine is positioned increases, the flow of fluid from the containment vessel interior portion 38 serves to compensate for the compression of air in these portions so that the internal pressure is always equal to the external pressure.

The containment vessel 26 may be integral with the body of the tapping machine 10 rather than being attached to it. The cavities 36 and 38 may be completely within the interior of the tapping machine body, or only cavity 38 may be within the interior of the tapping machine body. The actual appearance of apparatus for practicing the invention may be completely different than the illustrated embodiment shown and described herein for purposes of exemplifying the invention.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A pipeline tapping machine for use underwater comprising:
   a tapping machine body having means at one end for attaching to a fitting secured to a pipeline to be tapped, and having a boring bar therein having means at the other end to receive a pipeline perforating device;
   a gear case affixed to the body and adapted to activate said boring bar, the gear case having means to receive rotative power input, said tapping machine body and gear case having liquid lubricant therein;
   a containment vessel supported by said tapping machine body having a first opening therein communicating with the ambient pressure of the vessel exterior and a second opening communicating with the interior of said tapping machine body and said gear case;
   a fluid barrier pressure transmitting means within said containment vessel dividing the vessel interior into a first portion having said first opening therein and a second portion haing said second opening therein, the vessel having liquid lubricant in the second portion;
   means communicating said containment vessel second opening and the pressure of the liquid lubricant therein with the interior of said tapping machine body and gear case; and
   wherein said containment vessel has an interior wall defined in part by a first cylinder and a co-axial, reduced diameter second cylinder and wherein said pressure transmitting means is a first piston slideably and sealably received in said first cylinder and a second piston slideably and sealably received in said second cylinder, and means connecting said first and second pistons, said first piston being exposed to said vessel first portion and said second piston to said vessel second portion, whereby a postive pressure is maintained within said tapping machine body and gear case with respect to the ambient pressure.

2. An underwater tapping machine according to claim 1 including piping system connected to said containment vessel second opening to distribute equalizing fluid pressure of the liquid lubricant to a plurality of portions of said tapping machine body.

3. An underwater tapping machine according to claim 1 including a screen supported by said containment body in the path of fluid flow from the vessel exterior to said first interior portion.

4. A pipeline tapping machine for use under water comprising:
   a tapping machine body having means at one end for attaching to a fitting secured to a pipeline to be tapped, and having a boring bar therein having means at one end to receive a pipeline perforating device;
   a gear case affixed to the body and adapted to activate said boring bar, the gear case having means to receive power input isolated from ambient water, such as Pressurized hydraulic fluid, pressurized air of electrical energy, said tapping machine body and gear case having liquid lubricant therein;
   a containment vessel supported by said tapping machine body having a first opening therein communicating with the ambient pressure of the vessel exterior and a second opening communicating with the interior of said tapping machine body and said gear case;
   a fluid barrier pressure transmitting means within said containment vessel dividing the vessel interior into a first portion having said first opening therein and a second portion having said second opening therein, the vessel having liquid lubricant in the second portion;
   means communicating said containment vessel second opening and the pressure of the liquid lubricant therein with the interior of said tapping machine body and gear case whereby pressure interiorly and exteriorly of said tapping machine body and said gear case are equalized; and
   wherein said containment vessel is a cylinder having a first end with said first opening therein and a second end with said second opening therein and wherein said fluid barrier is a bladder of generally frusto-conical configuration, said vessel first portion being defined in part by said bladder frusto-conical interior and said vessel second portion being defined in part by said bladder frusto-conical exterior.

5. A tapping machine for use underwater comprising:
   a body having means at one end for performing work on an underwater object and having a portion extending sealably therefrom for performing such work, the body having liquid lubricant therein;
   a containment vessel supported by said body having first and second internal cylindrical co-axial portions, the first cylinder being of a reduced internal diameter compared to said second cylinder;
   a piston means sealably positioned in each of said cylinders, the piston measn being connected together for simultaneous movement;
   a compressible medium within said cylinders between said pistons;
   a means connecting said first cylinder to the interior of said body; and
   means connecting said second cylinder to the ambient pressure externally of said body whereby a positive pressure is maintained within said tapping machine body and said gear case with respect to ambient pressure.

6. A underwater machine according to claim 5 wherein said compressible medium within said cylinders between said pistons is a gas.

7. An underwater machine according to claim 5 wherein said first cylinder contains liquid lubricant in communication with said liquid lubricant in said body.

* * * * *